United States Patent [19]

Thew et al.

[11] Patent Number: 5,017,288

[45] Date of Patent: May 21, 1991

[54] CYCLONE SEPARATOR

[75] Inventors: Martin T. Thew, Bitterne; Ian C. Smyth, Eastleigh, both of England; Noel Carroll, Victoria, Australia

[73] Assignee: Conoco Specialty Products, Houston, Tex.

[21] Appl. No.: 415,316

[22] PCT Filed: Mar. 2, 1988

[86] PCT No.: PCT/AU88/00057

§ 371 Date: Oct. 11, 1989

§ 102(e) Date: Oct. 11, 1989

[87] PCT Pub. No.: WO88/06491

PCT Pub. Date: Sep. 7, 1988

[30] Foreign Application Priority Data

Jan. 19, 1987 [AU] Australia .......................... PI6355/87
Mar. 3, 1987 [AU] Australia .......................... PI0637/87

[51] Int. Cl.[5] ............................................ B01D 21/26
[52] U.S. Cl. ................................ 210/512.1; 209/211
[58] Field of Search ......................... 210/512.1, 512.2; 209/211

[56] References Cited

U.S. PATENT DOCUMENTS 2,756,878 7/1956 Herkenhoff ......................... 209/211
4,237,006 12/1980 Colman et al. ...................... 210/788
4,544,486 10/1985 Carroll ............................ 210/512.1
4,683,061 7/1987 Carroll ............................ 210/512.1
4,710,299 12/1987 Prendergast ........................ 209/211
4,721,565 1/1988 Carroll ............................ 209/211

OTHER PUBLICATIONS

WO85/00990 published 3/14/85 (209-211).

*Primary Examiner*—Bernard Nozick
*Attorney, Agent, or Firm*—John E. Holder

[57] ABSTRACT

A cyclone separator (10) of the dewatering type which comprises an elongated separating chamber (12) having an axis of symmetry between opposite first and second ends, the separating chamber being of greater cross-sectional dimension at the first end than at the second end. The cyclone separator further includes at least one inlet (20) which is adjacent the first end and at least one overflow outlet (25) for the less dense component and at least one underflow outlet (24) for the more dense component (24). The cyclone separator has a first section (14) which contains the feed inlet (20) and the first section is of reduced cross-sectional dimension $d_2$ at its downstream end relative to the upstream end and is characterized in that the ratio of cross-sectional dimension of the overflow outlet for the less dense component $d_0$ to the cross-sectional dimension of the first section at its downstream end $d_2$ is as follows $0.25 < D_0/d_2$ 0.65.

5 Claims, 1 Drawing Sheet

CYCLONE SEPARATOR

Figure 1:
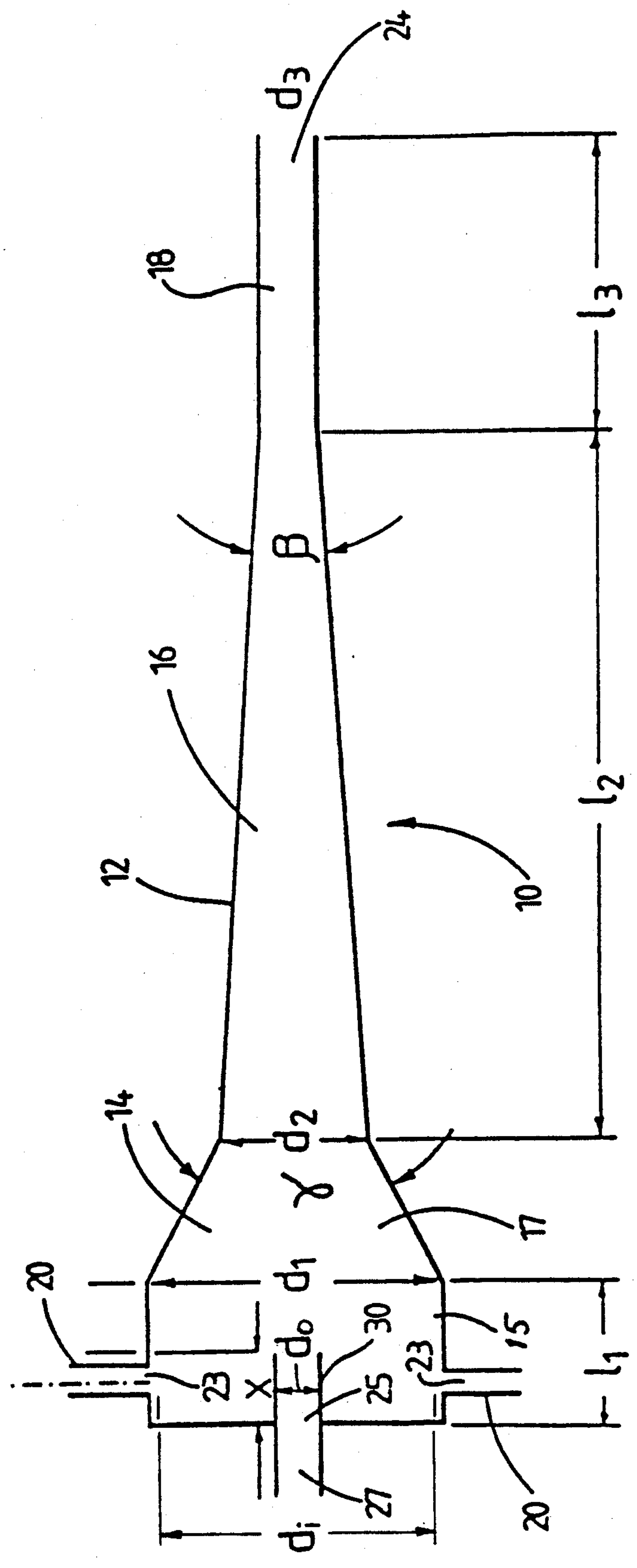

This invention relates generally to cyclone separators for separating multi-phase mixtures such as, for example, oil/water mixtures.

Cyclone separators have in recent times gained a wider acceptance in the oil industry for separating oil/water mixtures. There are two basic applications for cyclone separators in this particular field. In one application, a cyclone separator is used for removing oil from a mixture which contains a relatively large quantity of oil. In one type of application cyclone separators are used for removing a smaller volume of water (e.g. up to 45% by volume of the total) from a larger volume of oil with minimum contamination of the oil. Such cyclone separators are often referred to as dewatering cyclone separators or de-waterers. De-waterers are used for primary separation of the mixture. The other application is for cyclone separators which are used for removing a smaller volume of oil from a larger volume of water with minimum contamination of the water These cyclone separators are often referred to as de-oiling separators or de-oilers and are used for cleaning water after the primary separation process has been effected so that the water can, for example, be discharged in a non-contaminated state.

U.S. Pat. No. 4,237,006 (COLMAN et al) describes a cyclone separator of the de-oiling type having a separating chamber having first, second and third contiguous cylindrical portions arranged in that order. The first cylindrical portion is of greater diameter than the second cylindrical portion and the third cylindrical portion is of lesser diameter than the second cylindrical portion. The first cylindrical portion has an overflow outlet at the end thereof opposite to the second cylindrical portion and a plurality of tangentially directed feed inlets, the separator being adapted to separate liquids one from the other in a mixture when infed into said separating chamber via the feed inlet, one liquid emerging from the overflow outlet and the other passing through the third cylindrical portion in the direction away from the second cylindrical portion to emerge from an underflow outlet of the separator at the end of the separating chamber remote from said first cylindrical portion.

The above separator is intended specifically, but not exclusively, for separating oil from water, the oil in use emerging from the overflow outlet and the water from the third cylindrical portion.

The aforementioned cylindrical portions may not be truly cylindrical, in the sense that they do not need in all cases to present a side surface which is linear in cross-section and parallel to the axis thereof. For example, U.S. Pat. No. 4,237,006 describes arrangements wherein the first cylindrical portion has a frustoconical section adjacent the second cylindrical portion and which provides a taper between the largest diameter of the first cylindrical portion and the diameter of the second cylindrical portion where this meets the first cylindrical portion. Likewise, the aforementioned patent specification describes arrangements wherein a similar section of frustoconical form is provided to cause a tapering in the diameter of the second cylindrical portion from a largest diameter of the second cylindrical portion to the diameter of the third cylindrical portion. There is also described an arrangement wherein the second cylindrical portion exhibits a constant taper over its whole length.

In the Australian Patent Application 12421/83, various modifications of cyclone separators of the above de-oiling type are described, and these modifications may be incorporated into separators of this general kind. In U.S. Pat. No. 4,237,006 the described cyclone separator is said to comply with a number of dimensional restrictions insofar as the relative proportions of various components thereof are concerned. These constraints are:-

$$10 \leqq l_2/d_2 \leqq 25$$
$$0.04 \leqq 4A_i/\pi d_1^2 \leqq 0.10$$
$$0.1 \leqq d_o/d_2 \leqq 0.25$$
$$d_1 > d_2$$
$$d_2 > d_3$$

wherein $d_0$ is the internal diameter of the overflow outlet, $d_1$ is the diameter of the first portion, $d_2$ is the diameter of the second portion and $d_3$ is the diamcter of the third portion, $l_2$ is the length of thc second portion, $A_i$ is the total cross-sectional area of all the feed inlets measured at the points of entry into the separating chamber normal to the inlet flow. $A_i$ can be better defined by $$A_i = \sum_{x=1}^{n} A_{ix}$$

where $A_{ix}$ is the projection of the cross-sectional area of the $x^{th}$ inlet measured at entry to the cyclone separator in the plane parallel to the cyclone axis which is normal to the plane, also parallel to the cyclone separator axis which contains the tangential component of the inlet centre line.

Specification PCT/AU84/00164 further extended the dimensional constraints disclosed in the above U.S. specification in that it was found that it was not necessary to comply with the constraint concerning the ratio of the overflow outlet diameter to the diameter of the second cylindrical portion. Neither was it necessary to adhere to the maximum limit of 25 for the ratio $l_2/d_2$, since greater values of this ratio could be employed.

Again, in the arrangement of U.S. patent specification 4,237,006, two feed inlets were disclosed but it was found that one inlet or more than two inlets could be used.

De-watering cyclone separators are a more recent phenomenon and geometrical relationships for these types of separators have now been found. A problem which exists, however, is that the de-oiling geometry and that of known de-watering type separators has been substantially different and, as such, manufacture of complete systems has been relatively expensive.

With this in mind it has been surprisingly discovered that by modifying certain parts of the de-oiler type cyclone separator a separator which operates as a de-waterer in a satisfactory manner can be achieved.

According to the present invention there is provided a cyclone separator of the de-watering type comprising an elongated separating chamber having an axis of symmetry between opposite first and second ends, the separating chamber being of greater cross-sectional dimension at the first end than at the second end, the cyclone separator further including at least one inlet which is adjacent said first end, at least one overflow outlet for the less dense component and at least one underflow outlet for the more dense component said separating chamber including a first section which contains said at least one feed inlet said first section being of reduced cross-sectional dimension $d_2$ at its downstream end relative to the upstream end characterized in that the ratio of the cross-sectional dimension of said overflow outlet for the less dense component $d_0$ to the cross-sectional dimension of the first section at its downstream end $d_2$ is as follows: $0.25 < d_0 | d_2 < 0.65$, preferably $$0.31 < \frac{d_o}{d_2} \cdot \leqq 0.50$$

Preferably a vortex finder is provided at said overflow outlet. Preferably the vortex finder outlet terminates within 3 $d_2$ of the inlet plane. The inlet plane is defined as the plane perpendicular to the axis of the cyclone separator at the mean axial position of the weighted areas of the inlets such that the injection of angular momentum into the cyclone separator is equally distributed axially about it and thus $$\frac{1}{A_i d_i} \sum_{x=1}^{n} Z_x A_{ix} d_{ix} = 0$$

where $Z_x$ is the axial position of the centre line of the $x^{th}$ inlet, and $d_{ix}$ is hereinafter defined.

The invention will now be further described by way of example only with reference to the accompanying drawings in which:

FIG. 1 is a cross-sectional diagram of a separator constructed in accordance with the invention.

The separator 10 comprises a separating chamber 12 having three coaxially arranged separating chamber sections 14, 16, 18 of cylindrical configuration. It will be appreciated that the term cylindrical as used here includes frusto-conical sections. Section 14 is of greater diameter than section 16 and section 18 is of lesser diameter than portion 16. As described in the specification of Patent Application PCT/AU83/00028, a flow restricting means (not shown) may be provided at the outlet from the cylindrical section 18 but in this instance the outlet end is shown as being provided by an underflow outlet 24 from cylindrical section 18. Section 14 may include a cylindrical portion 15 and a tapered portion ∇. The tapered portion is tapered at an angle indicated by $\alpha$. Two inlets 20 are shown at separating chamber section 14 these opening into a side wall of the-separating chamber at inlet openings 23. An overflow outlet 25 is provided on the axis of the separating chamber section 14, this leading to an axial overflow pipe 27. Although two inlets 20 are shown a single inlet may be provided such as that described in specification PCT/AU85/00166. The second section 16 is tapered at an angle indicated by $\beta$.

In use, the separator 10 functions generally in accordance with past practice in that the fluid mixture admitted into the separating chamber via the inlets 20 is subjected to centrifugal action causing the separated liquid components to be ejected, on the one hand from the outlet 24 and on the other through the outlet 25. Thus, the denser phase material flows to the underflow outlet 24 in an annular cross-sectioned flow around the wall of the separating chamber whilst the lighter phase forms a central core 40 which is subjected to differential pressure action driving the fluid therein out the overflow outlet 25.

The specification may be of the general type (i.e. the same as or of a modified form described in U.S. Pat. No. 4,237,006 with the exception that the $d_0/d_2$ value is different. For example the following relationships may apply:-

$$10 \leqq l_2/d_2 \leqq 25$$

$$3 \leqq \frac{\pi d_2 d_i}{4A_i} \leqq 30$$

$$d_1 > d_2$$
$$d_2 > d_3$$

$0.25 < d_0/d_2 < 0.65$ preferably $0.31 < d_0/d_2 < 0.50$ where $A_i$ redefined as before provided by inlet opening 23, $d_0$ is the diameter of the overflow outlet 25

$$d_i = \frac{1}{A_i} \sum_{x=1}^{n} d_{ix} A_{ix}$$

where $d_{ix}$ is twice the radius at which flow enters the cyclone through the $x^{th}$ inlet (i.e. twice the minimum distance of the tangential component of the inlet center line from the axis) and the remaining terms have the meanings ascribed to above.

The separator further includes a vortex finder (30) which extends into the first section of the separating chamber. The purpose of the vortex finder in de-watering applications is to discourage the re-entrainment of water droplets into the main body of flow through the overflow outlet.

EXAMPLE 1

A water/kerosene mixture was tested for separation in a modified de-oiling separator. Various mixtures were used in the range from 5% water up to 60% water and flow rates were varied from 35 to 70 litres/minute.

The cyclone separator had a diameter $d_2$ of 30mm and the following geometrical relationships applied:-

| | | | |
|---|---|---|---|
| $d_o$ | $= 0.33\ d_2$ | $l_1$ | $= 3.4\ d_2$ |
| $d_i$ | $= 0.33\ d_2$ | $l_3$ | $= 22\ d_2$ |
| $d_1$ | $= 1.93\ d_2$ | $\alpha$ | $= 20°$ |
| $d_3$ | $= 0.53\ d_2$ | $\beta$ | $= 1° 20'$ |

The inlet center lines were disposed 0.67 $d_2$ downstream of the end wall of the separator.

A vortex finder was disposed adjacent the overflow outlet and was of length $x = 0.83\ d_2$.

The results of these tests showed commercially practicable water/kerosene separation was achieved over a full range of water concentrations and split ratio tested. The separator was observed to operate satisfactorily over a wide range of flow rates. It was found that the pressure drops required across the separator were considerably improved.

EXAMPLE 2

A water/oil mixture was tested for separation in a modified de-oiling separator. A flow rate of about 100 litres per minute was used and the mixture contained 73% oil. The cyclone separator had a diameter $d_2$ of 35mm and the following geometrical relationships applied:-

$$d_o = .32\,d_2 \quad l_1 = 2\,d_2$$
$$d_1 = 2\,d_2 \quad l_3 = 20\,d_2$$
$$d_3 = 0.5\,d_2 \quad \alpha = 20^\circ$$
$$\beta = 1.5^\circ$$

The inlet was a single involute type with a rectangular cross-section of 35 ×5.6mm.

It was found that commercially satisfactory separation of the oil from the water at the overflow outlet were achieved together with a satisfactory flow rate.

EXAMPLE 3

The test conditions were the same as for example 2 except that a vortex finder was disposed adjacent the overflow outlet, the vortex finder having a length of $X = 0.9\ d_2$.

Similar results to that of example 2 were obtained although the separation at the oil outlet was improved.

EXAMPLE 4

A water/oil mixture was tested for separation in a modified form of de-oiling separator. Flow rates between 7 and 85 litres/minute were tested and the mixture contained between 75% to 85% oil and the following geometrical relationships applied:-

$$d_o = .48\,d_2 \quad l_1 = 2\,d_2$$
$$d_1 = 2\,d_2 \quad l_3 = 20\,d_2$$
$$d_3 = 0.5\,d_2 \quad \alpha = 20^\circ$$
$$\beta = 1.5^\circ$$

The oil/water separation was found to be commercially satisfactory as was the flow rate from the overflow outlet.

EXAMPLE 5

The test conditions were the same as for example 4 except that a vortex finder was provided at the overflow outlet having a length $X = 0.9\ d_2$.

Again the results showed an improvement in the oil/water separation at the overflow outlet compared to example 4.

We claim:

1. A cyclone separator of the dewatering type comprising an elongated separating chamber having a longitudinal axis of symmetry between opposite first and second ends, the separating chamber being of greater cross-sectional dimension at the first end than at the second end, the cyclone separator further including at least one inlet which enters the separating chamber in an inlet plane perpendicular to the longitudinal axis of the separating chamber and which inlet is adjacent said first end, at least one overflow outlet for the less dense component and at least one underflow outlet for the more dense component, said separating chamber including a first section which contains at least one feed inlet, said first section being of reduced cross-sectional dimension $d_2$ at its downstream end relative to the upstream end, characterized in that the ratio of cross-sectional dimension $d_0$ of said overflow outlet for the less dense component to the cross-sectional dimension $d_2$ of the first section at its downstream end is as follows:

$$0.25 < \frac{d_o}{d_2} < 0.65,$$

a vortex finder disposed adjacent the outlet for the less dense component, wherein the opening to said vortex finder outlet terminates within 3 $d_2$ of the inlet plane and wherein the following relationship applies:

$$3 \leq \frac{\pi d_2 d_i}{4A_i} \leq 30$$

where $A_1$ is the total cross-sectional area of the or each feed inlet and $d_1$ is twice the radius at which flow enters the cyclone measured as the minimum distance of the tangential component of the inlet center line from the cyclone axis.

2. A cyclone separator according to claim 1 wherein said separating chamber includes a second tapered section having a length $l_2$ and a third substantially cylindrical section $l_3$ arranged in order with said first section.

3. A cyclone separator according to claim 2 wherein the following dimensional relationship applies:

$$10 \leq l_2/d_2 \leq 25 .$$

4. A dewatering hydrocyclone for removing smaller amounts of water from a mixture having a substantially large amount of oil when compared to a deoiling hydrocyclone for separating mixtures having a small amount of oil, which dewatering hydrocyclone is a modification of a deoiling hydrocyclone to provide dewatering capabilities, and comprising:

an elongated separating chamber having a longitudinal axis of symmetry between opposite first and second ends, the separating chamber being of greater cross-sectional dimension at the first end than at the second end, the hydrocyclone further including at least one inlet which enters the separating chamber in an inlet plane perpendicular to the longitudinal axis of the separating chamber and which inlet is adjacent said first end, at least one overflow outlet for the less dense component and at least one underflow outlet for the more dense component of the mixture being separated, said separating chamber including a first section which contains said at least one feed inlet, said first section being of reduced cross-sectional dimension $d_2$ at its downstream end relative to the upstream end characterized in that the ratio of cross-sectional dimension $d_0$ of the overflow outlet for the less dense component to the cross-sectional dimension $d_2$ of the first section at its downstream end is as follows:

$$0.25 < \frac{d_o}{d_2} < 0.65$$

and, a vortex finder disposed adjacent the outlet for the less dense component wherein the opening to said vortex finder terminates within 3 $d_2$ of the inlet plane and, wherein the following relationship applies:

$$3 \leq \frac{\pi d_2 d_i}{4A_i} \leq 30$$

wherein $A_1$ is the total cross-sectional area of the or each feed inlet and $d_1$ is twice the radius at which flow enters the cyclone measured as the minimum distance of the tangential component of the inlet center line from the cyclone axis.

5. A dewatering hydrocyclone according to claim 4 wherein said separating chamber includes a second section arranged in order downstream of said first section with the following dimensional relationship applying:

$$10 \leqq \frac{l_2}{d_2} \leqq 25,$$

where $l_2$ is the length of the second section.

* * * * *

UNITED STATES PATENT AND TRADEMARK OFFICE
CERTIFICATE OF CORRECTION

PATENT NO. : 5,017,288

DATED : May 21, 1991

INVENTOR(S) : Martin T. Thew, et al.

It is certified that error appears in the above-identified patent and that said Letters Patent are hereby corrected as shown below:

Column 5, line 27, after "oil" insert --.--

Column 5, line 27, before the word "and" insert --The cyclone separator had a diameter $d_2$ of 35 mm--

Column 5, line 62, after "contains" insert --said--

Signed and Sealed this

Twenty-second Day of September, 1992

*Attest:*

DOUGLAS B. COMER

*Attesting Officer*

*Acting Commissioner of Patents and Trademarks*